US009686654B2

(12) United States Patent
Sayeed et al.

(10) Patent No.: US 9,686,654 B2
(45) Date of Patent: Jun. 20, 2017

(54) METHOD AND APPARATUS FOR PROVIDING BROADCAST OR MULTICAST SERVICE TO OBSTRUCTED USER EQUIPMENT

(71) Applicant: ALCATEL-LUCENT USA INC., Murray Hill, NJ (US)

(72) Inventors: Zulfiquar Sayeed, Hightstown, NJ (US); Edward Grinshpun, Freehold, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 81 days.

(21) Appl. No.: 13/722,076

(22) Filed: Dec. 20, 2012

(65) Prior Publication Data

US 2014/0177503 A1    Jun. 26, 2014
US 2017/0118600 A9    Apr. 27, 2017

Related U.S. Application Data

(60) Provisional application No. 61/666,122, filed on Jun. 29, 2012.

(51) Int. Cl.
*H04W 4/06* (2009.01)
*H04W 48/16* (2009.01)
*H04W 48/04* (2009.01)

(52) U.S. Cl.
CPC .............. *H04W 4/06* (2013.01); *H04W 48/04* (2013.01); *H04W 48/16* (2013.01)

(58) Field of Classification Search
CPC ........ H04W 48/04; H04W 48/16; H04W 4/06
(Continued)

(56) References Cited

U.S. PATENT DOCUMENTS 6,704,576 B1    3/2004    Brachman et al.
8,068,515 B2 *  11/2011   May, Jr. ................. 370/503
(Continued)

FOREIGN PATENT DOCUMENTS

EP    2043404 A1    4/2009
JP    2003-258827   9/2003
(Continued)

OTHER PUBLICATIONS

International Search Report and Written Opinion correlating to PCT/US2013/048118 dated Oct. 9, 2013, 11 pages.
(Continued)

*Primary Examiner* — Redentor Pasia
(74) *Attorney, Agent, or Firm* — Davidson Sheehan LLP

(57) ABSTRACT

Embodiments of the claimed subject matter provide a method and apparatus for providing multicast/broadcast information to obstructed user equipment. Some embodiments of the apparatus include a gateway configured for communicative coupling to an antenna. The gateway is configurable to establish a first broadcast/multicast session for receiving at least one broadcast or multicast service associated with user equipment and establish a second session for providing information received in the first broadcast/multicast session to the user equipment. Some embodiments include user equipment are configurable to provide a request to receive a broadcast service or a multicast service from a gateway that receives the broadcast or multicast service(s) via a first broadcast/multicast session. Some embodiments of the user equipment are also configurable to establish a second session with the gateway for receiving the broadcast or multicast service(s).

27 Claims, 7 Drawing Sheets

(58) Field of Classification Search
USPC .............................. 370/329, 390, 401, 432
See application file for complete search history.

(56) References Cited

U.S. PATENT DOCUMENTS

| | | | |
|---|---|---|---|
| 8,199,732 B2* | 6/2012 | Narasimhan et al. | 370/338 |
| 8,379,528 B1* | 2/2013 | Xue et al. | 370/241 |
| 8,542,682 B2* | 9/2013 | Thyni et al. | 370/390 |
| 8,693,367 B2 | 4/2014 | Chowdhury et al. | |
| 2006/0047845 A1* | 3/2006 | Whited et al. | 709/231 |
| 2006/0291466 A1 | 12/2006 | May, Jr. | |
| 2007/0110017 A1* | 5/2007 | Fulknier | H04L 45/00 370/338 |
| 2007/0183358 A1 | 8/2007 | Cai | |
| 2009/0312008 A1 | 12/2009 | Lindoff et al. | |
| 2010/0128727 A1* | 5/2010 | Takechi | 370/392 |
| 2010/0172283 A1* | 7/2010 | Karaoguz et al. | 370/312 |
| 2011/0007668 A1 | 1/2011 | Shang et al. | |
| 2011/0106961 A1 | 5/2011 | Glasser et al. | |
| 2011/0110286 A1* | 5/2011 | Lu et al. | 370/312 |
| 2011/0182235 A1 | 7/2011 | Shaheen et al. | |
| 2012/0243504 A1 | 9/2012 | Hsieh | |
| 2012/0263086 A1 | 10/2012 | Liu et al. | |
| 2013/0024582 A1 | 1/2013 | Rodrigues | |
| 2013/0028118 A1 | 1/2013 | Cherian et al. | |
| 2013/0077482 A1 | 3/2013 | Krishna et al. | |
| 2013/0223240 A1 | 8/2013 | Hayes et al. | |
| 2014/0126373 A1 | 5/2014 | Ye et al. | |
| 2014/0176659 A1 | 6/2014 | Khay-Ibbat et al. | |
| 2014/0342738 A1* | 11/2014 | Ishii | H04W 28/08 455/436 |

FOREIGN PATENT DOCUMENTS

| | | |
|---|---|---|
| JP | 2005-341300 | 12/2005 |
| JP | 2010-050855 | 3/2010 |
| KR | 10-2009-0043833 | 5/2009 |
| KR | 10-2012-0046419 | 5/2012 |
| WO | 2007075398 A2 | 7/2007 |
| WO | 2009011621 A1 | 1/2009 |
| WO | WO2009043389 | 4/2009 |
| WO | 2009095369 A1 | 8/2009 |
| WO | WO2010/073403 | 7/2010 |
| WO | WO2010/084574 | 7/2010 |
| WO | 2011035168 A1 | 3/2011 |
| WO | 2011053858 A1 | 5/2011 |

OTHER PUBLICATIONS

3rd Generation Partnership Project, Local IP Access and Selected IP Traffic Offload (LIPA-SIPTO), Technical Specification Group Services and System Aspects, 23.829 V10.0.1, 3rd Generation Partnership Project, Oct. 2011.

3rd Generation Partnership Project, Service requirements for Home Node B (HNB) and Home eNode B (HeNB), Technical Specification Group Services and System Aspects, 22.220 V11.6.0, 3rd Generation Partnership Project, Sep. 2012.

3rd Generation Partnership Project, General Packet Radio Service (GPRS) enhancements for Evolved Universal Terrestrial Radio Access Network (E-UTRAN) access, Technical Specification Group Services and System Aspects, 23.401 V12.0.0 , 3rd Generation Partnership Project, Mar. 2013.

3rd Generation Partnership Project, Local IP access (LIPA) mobility and Selected IP Traffic Offload (SIPTO) at the local network, Technical Specification Group Services and System Aspects, 23.859 V12.0.1 , 3rd Generation Partnership Project, Apr. 2013.

3rd Generation Partnership Project, Service aspects; Service principles, Technical Specification Group Services and System Aspects, 22.101 V12.4.0 , 3rd Generation Partnership Project, Mar. 2013.

3rd Generation Partnership Project; Technical Specification Group Services and System Aspects; Multimedia Broadcast/Multicast Service (MBMS); Architecture and functional description (Release 11) 3GPP TS 23.246 V11.1.0 Technical Specification, Mar. 2012.

PCT Patent Application No. PCT/US2013/047605, International Search Report mailed Sep. 18, 2013, 4 pgs.

Jaime Garcia et al, A broadcasting enabled Residential Gateway for Next Generation Networks, Broadband Convergence Networks, 2nd IEEE/IFIP International Workshop, May 1, 2007, pp. 1-12.

PCT Patent Application No. PCT/US2013/047890, Partial International Search mailed Oct. 10, 2013, 2 pgs.

U.S. Appl. No. 13/722,317, filed Dec. 12, 2012, entitled "Method and Apparatus for Switching Between Multicast/Broadcast and Unicast Service".

U.S. Appl. No. 13/924,378, filed Jun. 21, 2013, entitled "Seamless Make-Before-Break Transfer of Multicast/Broadcast Sessions".

Non-Final Office Action mailed Sep. 24, 2014, for U.S. Appl. No. 13/722,317, 30 pages.

Final Office Action mailed Jan. 5, 2015, for U.S. Appl. No. 13/722,317, 17 pages.

Notice of Allowance mailed Mar. 3, 2015, for U.S. Appl. No. 13/722,317, 23 pages.

Non-Final Office Action mailed Mar. 2, 2015, for U.S. Appl. No. 13/924,378, 31 pages.

Soft Handover for MBMS, MBMS-000032, Apr. 22, 2003, URL:http://www.3gpp.org/ftp/tsg_geran/tsg_geran/AD-HOCs/MBMS/0205_MBMS_London/Docs/.

Non-Final Office Action mailed Oct. 19, 2015 in U.S. Appl. No. 13/924,378, 25 pages.

Final Office Action mailed Jul. 27, 2016, in U.S. Appl. No. 13/924,378, 28 pages.

Non-Final Office Action mailed Dec. 16, 2016 for U.S. Appl. No. 13/924,378, 26 pages.

* cited by examiner

METHOD AND APPARATUS FOR PROVIDING BROADCAST OR MULTICAST SERVICE TO OBSTRUCTED USER EQUIPMENT

CROSS REFERENCE TO RELATED APPLICATIONS

This application claims priority to U.S. Provisional Patent Application 61/666,122 filed on Jun. 29, 2012.

BACKGROUND

This application relates generally to communication systems, and, more particularly, to wireless communication systems.

Wireless communication systems use a network of access points such as base stations to provide wireless connectivity to various access terminals, such as mobile units and/or other devices that are enabled for wireless communication. The coverage area of a wireless communication system is typically divided into a number of geographic areas that are conventionally referred to as cells or sectors. The coverage area of each cell in the wireless network is limited by the propagation loss of radio signals transmitted by access points that provide coverage to the cell. Thus, the coverage area of each cell is determined by the location and the transmit power of the access point, as well as other factors including the geography of the cell and the location of any interfering objects. For example, the coverage area of a cell may be reduced if a building or a mountain is present near the access point. The boundaries of the cells are not rigidly defined and may vary with time. Thus, coverage areas may overlap such that multiple access points may provide coverage to the overlapping regions, although the strength of the signal provided within the overlapping regions may be different for the different access points.

Wireless communication standards such as Long Term Evolution (LTE, LTE-Advanced) support broadcasting or multicasting services such as the multimedia broadcast multicast service (MBMS) or the enhanced multimedia broadcast multicast service (eMBMS). The MBMS services broadcast or multicast data from base stations over the air interface on channels that can be received by one or more users. The eMBMS is an enhanced version that provides additional features such as an architecture and physical layer enhancements that allow the eMBMS service to carry multimedia information to user equipment. Typically, users subscribe to particular programs that they may then receive using the MBMS service. Once a user has subscribed to a program and begun to receive the program, the user expects to receive the program without interruption even though the user may move into or out of buildings, cars, buses and the like. However, any obstruction between the user and a base station can cause channel losses that reduce the signal strength of the MBMS signal. For example, building penetration losses are typically on the order of 11-20 dB and car penetration losses are typically on the order of 7 dB.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

As discussed herein, building penetration losses are typically on the order of 11-20 dB and car penetration losses are typically on the order of 7 dB. Channel losses reduce the coverage area of base stations in the wireless communication system. For a given transmission power, the approximate radius (R) of the coverage area may be related to the loss ratio (in dB) by the equation:

$$R \text{-const} \times 10^{-loss\ in\ dB},$$

The constant in this equation may be determined empirically, theoretically, experimentally, or using other techniques. The area ($A_{BS}$) covered by an individual base station that provides uniform coverage is approximately proportional to $R^2$ and so the number of base stations required to provide coverage to an area ($A_{cov}$) is approximately given by:

$$N \sim \frac{A_{cov}}{A_{BS}} \sim \frac{A_{cov}}{R^2} \sim 10^{2 \times loss\ in\ dB}$$

The number of base stations needed to cover the area ($A_{cov}$) thus increases exponentially as the expected channel losses (in decibels) increase. The large channel losses created by building penetration or car penetration therefore significantly increase the link budget (e.g., the number of base stations or the transmission power of individual base stations) needed to provide ubiquitous coverage for MBMS services. The disclosed subject matter is directed to addressing the effects of one or more of the problems set forth above.

In one embodiment, an apparatus is provided for providing broadcast or multicast services to obstructed user equipment. Some embodiments of the apparatus include a gateway configured for communicative coupling to an antenna. The gateway is configured to establish a first broadcast/multicast session for receiving at least one broadcast or multicast service associated with user equipment and establish a second session for providing information received in the first broadcast/multicast session to the user equipment. Methods that may be implemented in some embodiments of the gateway are also provided.

In another embodiment, user equipment is provided for receiving broadcast or multicast services. Some embodiments of the user equipment are configured to provide a request to receive a broadcast service or a multicast service from a gateway that receives the broadcast or multicast service(s) via a first broadcast/multicast session. Some embodiments of the user equipment are also configured to establish a second session with the gateway for receiving the broadcast or multicast service(s). Methods that may be implemented in some embodiments of the user equipment are also provided.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
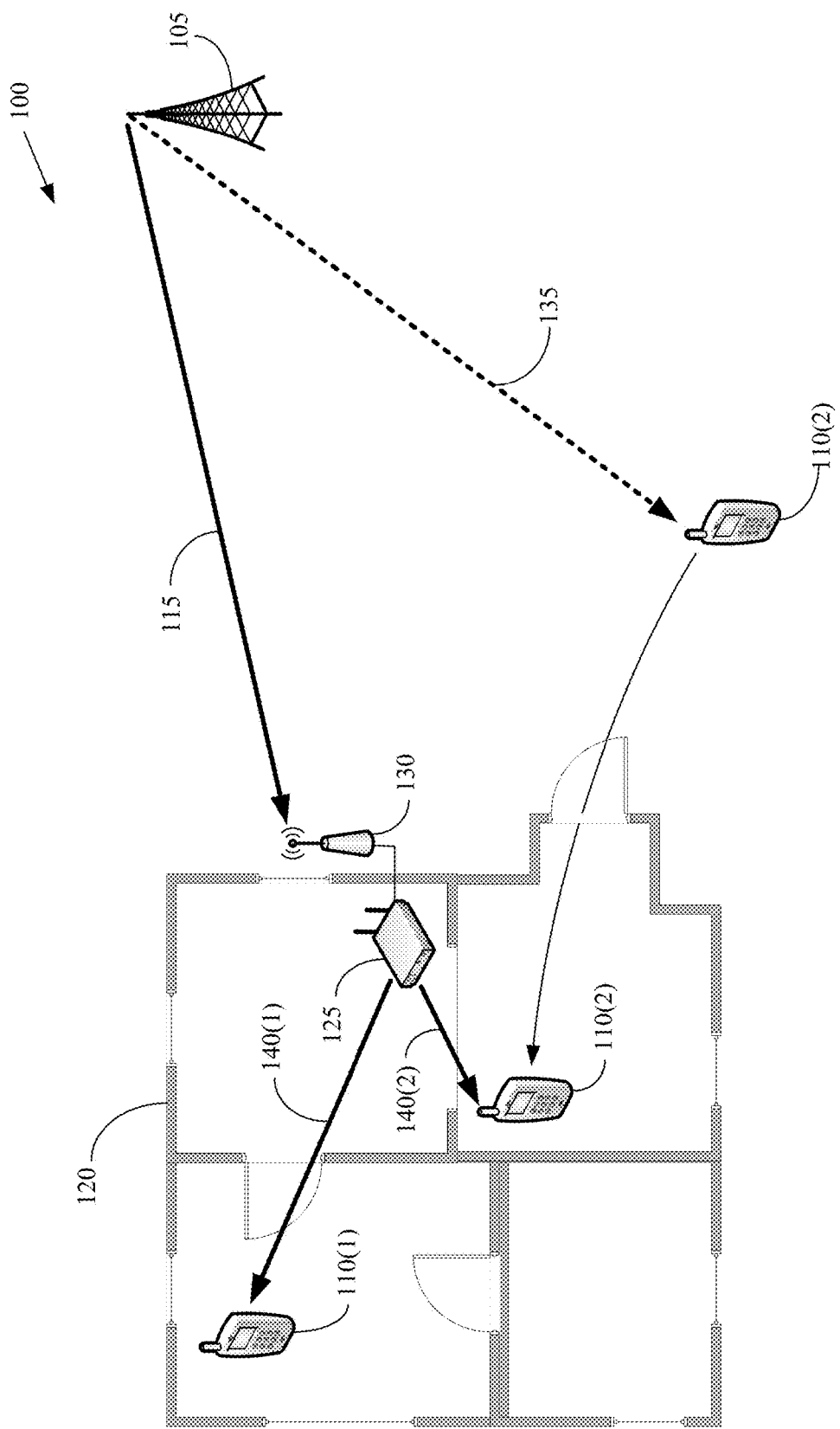
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, channel losses caused by obstructions in the signal path, such as building walls and car windows, can significantly increase the link budget for a wireless communication system. At least in part to address these drawbacks in the conventional practice, the present application describes embodiments of a gateway that can be deployed or configured to terminate a multicast or broadcast session associated with user equipment and convey information that is multicast or broadcast to the user equipment using the session. For example, the gateway may be deployed inside a building, a vehicle, or other structure and communicatively coupled to an antenna deployed on an external surface of the building, vehicle, or other structure. The gateway can receive multicast or broadcast transmissions via the external antenna and convey them to user equipment inside the building or vehicle using a different session such as a Wi-Fi session, wired Ethernet, or other proprietary or non-proprietary wireless or wired links.

Some embodiments of the gateway and the user equipment include session managers that can be configured to communicate with each other to facilitate the establishment of a user session when user is inside the building, vehicle, or other structure. For example, if a user is receiving a broadcast or multicast transmission and moves from a location outside of a building to the interior of the building, the user equipment may initiate a new "interior" session with the gateway for receiving the multicast transmission, e.g., using a wired or WiFi session between the user equipment and the gateway. The gateway may also initiate a new "exterior" session to receive the broadcast or multicast transmission on behalf of the user equipment, e.g. an eMBMS session with one or more eNodeBs. For example, when user equipment nears a gateway deployed proximate the building, session managers in the user equipment and the gateway may exchange information that allows the gateway to register as a termination point for a multicast or broadcast session that can receive a program being received (or is scheduled to be received) by the user equipment using a current MBMS session. Alternatively, the gateway may have a pre-existing exterior session for receiving the broadcast/multicast transmission. Some embodiments of the session managers may be used to negotiate, authenticate, time synchronize, and "tie together" the interior session and the exterior session into a single multimedia application session. Depending upon whether the wired or wireless session is IP multicast or unicast, these session managers also may be responsible for repackaging IP packets from an exterior format used by eMBMS to an interior format used by the wired or wireless session.

Some embodiments of the user equipment and the gateway may similarly communicate to allow the user equipment to establish an MBMS session (and have the gateway drop its corresponding MBMS session) when the user equipment leaves the building or vehicle. A wireless communication system that deploys gateways to provide multicast or broadcast services within buildings, vehicles, or other structures may avoid the large channel losses created by building penetration or car penetration and may therefore significantly reduce the link budget (e.g., the number of base stations or the transmission power of individual base stations) needed to provide ubiquitous coverage for MBMS services.

FIG. 1 conceptually illustrates a first exemplary embodiment of a wireless communication system 100. In the illustrated embodiment, an eNodeB (eNB) 105 is used to provide broadcast or multicast services to a corresponding geographic area or cell, which may include one or more user equipment 110. A building 120 may be located within the geographic area or cell served by the eNB 105. As discussed herein, obstructions such as the doors, windows, or walls of the building 120 may significantly increase channel loss between the user equipment 110 and the eNB 105. Exemplary building penetration losses are typically on the order of 11-20 dB and car penetration losses are typically on the order of 7 dB. For a given transmission power, the penetration losses may degrade the quality of the broadcast or multicast service or cause the service to be lost. Larger system link budgets may therefore be necessary to overcome the penetration losses while providing a particular quality of service.

A gateway 125 may therefore be deployed on an interior surface of the building 120, as shown in FIG. 1. The gateway 125 may then be physically, electromagnetically, or communicatively coupled to an antenna 130 that is deployed outside of the building 120, e.g., by mounting the antenna 130 on an exterior surface of the building 120. For example, the gateway 125 may be coupled to the antenna 130 using a cable that passes from the exterior to the interior of the building 120. For another example, a wireless link may be established between the interior gateway 125 and the exterior antenna 130. Some embodiments of the gateway 125 may alternatively be deployed exterior to the building 120. For example, the gateway 125 and the antenna 130 may be implemented in a single box, which may be hardened to withstand environmental conditions expected exterior to the building 120. Some embodiments of the wireless communication system may include other obstructions such as vehicles and the gateway 125 and antenna 130 may be deployed in, on, or proximate these obstructions, as discussed herein.

User equipment 110(1) is located interior to the building 120 and the signal path from the base station 105 to the user equipment 110(1) may therefore be obscured by walls, doors, or windows in the building 120. User equipment 110(1) may therefore transmit a request to the gateway 125 to receive broadcast or multicast services that may be provided by the wireless communication system 100 via the base station 105. The gateway 125 may therefore establish a broadcast/multicast session 115 to receive the requested broadcast or multicast services transmitted by the base station 105. As used herein, the term "broadcast/multicast session" should be understood to refer to a session that can be used to carry transmissions of broadcast or multicast services. Examples of broadcast/multicast sessions include, but are not limited to, MBMS sessions or eMBMS sessions. Furthermore, the broadcast/multicast session does not necessarily carry either broadcast or multicast services at any particular time because the transmissions may depend on the available programming and the choices made by individual users.

When the gateway 125 receives the request from the user equipment 110(1), the gateway 125 may initiate a broadcast/multicast session 115 with the eNB 105 that provides the broadcast or multicast service. The broadcast/multicast session 115 may be referred to as an exterior session 115 to indicate that the signal path or paths between the antenna 130 and the eNB 105 is substantially outside of the building 120. Persons of ordinary skill in the art having benefit of the present disclosure should appreciate that the phrase "substantially outside" is intended to mean that the signal path or paths of the session 115 remains predominantly outside of the building 120 or other structures. However, portions of one or more of the path(s) of the session 115 may pass through other structures or environmental obstacles even though the path is "substantially outside" of the building 120. These portions are expected to be small relative to the overall length of the path(s).

The gateway 125 may also establish a communication session 140(1) with the user equipment 110(1). The session 140(1) may be referred to as an interior session to indicate that the signal path between the gateway 125 and the user equipment 110(1) is substantially within the building 120. Some embodiments of the communication session 140(1) may be configured to unicast information to user equipment 110(1) using transmission control protocol (TCP) over Wi-Fi. Other embodiments of the communication session 140(1) may be carried over other access media including, but not limited to, wired Ethernet access, femtocells, picocells, base station routers, or other types of wired or wireless access. The communication session 140(1) may also be established with multiple user equipment 110 and content can be multicast from the gateway 125 to user equipment 110. As discussed herein, session managers (not shown in FIG. 1) in the user equipment 110(1) and the gateway 125 may be used to negotiate, authenticate, time synchronize, or "tie together" the interior session 140(1) and the exterior session 115 into a single multimedia application session.

Mobile user equipment 110(2) may transition existing broadcast or multicast services from an exterior session to interior sessions. In the illustrated embodiment, user equipment 110(2) is located in the cell and has subscribed to the broadcast/multicast service provided by the eNB 105. User equipment 110(2) has therefore established a broadcast/multicast session with the eNB 105, as indicated by the dashed line 135. User equipment 110(2) may be actively receiving broadcast or multicast transmissions using the session 135 or, alternatively, user equipment 110(2) may have subscribed to a future broadcast or multicast transmission and established the broadcast/multicast session 135 for receiving the broadcast or multicast transmission at a subsequent scheduled time. A user of the user equipment 110(2) may be mobile while receiving the broadcast or multicast transmissions over the session 135 or prior to receiving a scheduled broadcast or multicast transmission. The user may carry the user equipment 110(2) into a building, a vehicle, or other structure that obstructs or intervenes along the signal path from the eNB 105 to user equipment 110(2). The user equipment 110(2) depicted in FIG. 1 moves from a location that is exterior to a building 120 to a location that is interior to the building 120. However, persons of ordinary skill in the art having benefit of the present disclosure should appreciate that embodiments of the techniques described herein apply equally to user equipment 110 that move into a vehicle or other structure that may obscure signals transmitted by the base station 105.

The gateway 125 may then be configured so that it can establish a broadcast/multicast session with the eNB 105 in response to the user equipment 110(2) moving proximate to the gateway 125 or entering the building 120. Some embodiments of the user equipment 110(2) can monitor the signal strength associated with a signal such as a pilot signal transmitted by the gateway 125. When the user equipment 110(2) determines that the signal strength has exceeded a threshold, the user equipment 110(2) may attach to the gateway 125. The user equipment 110(2) may then signal to the gateway 125 that it has an ongoing multicast service or a scheduled multicast service associated with the session 135. In some embodiments, the signal strength of the pilot signal transmitted by the gateway 125 and received at the user equipment 110(2) may be a measure of a distance between the gateway 125 and user equipment 110(2). Some embodiments may alternatively use location information, such as GPS information, to determine locations of the gateway 125 and user equipment 110(2). The location information may be used to determine a distance between the gateway 125 and user equipment 110(2), which may then be used to trigger establishment of the broadcast/multicast session between the gateway 125 and the eNB 105, e.g., when the distance is smaller than a threshold distance.

When the gateway determines that the user equipment 110(2) is nearby or inside of the building 120, the gateway 125 may initiate a broadcast/multicast session 115 with the eNB 105 that corresponds to the session 135. The gateway 125 may also establish a communication session 140(2) with the user equipment 110(2). As discussed herein, session managers (not shown in FIG. 1) in the user equipment 110(2) and the gateway 125 may be used to negotiate, authenticate, time synchronize, or "tie together" the interior session 140(2) and the exterior session 115 into a single multimedia application session.

Figure 2:
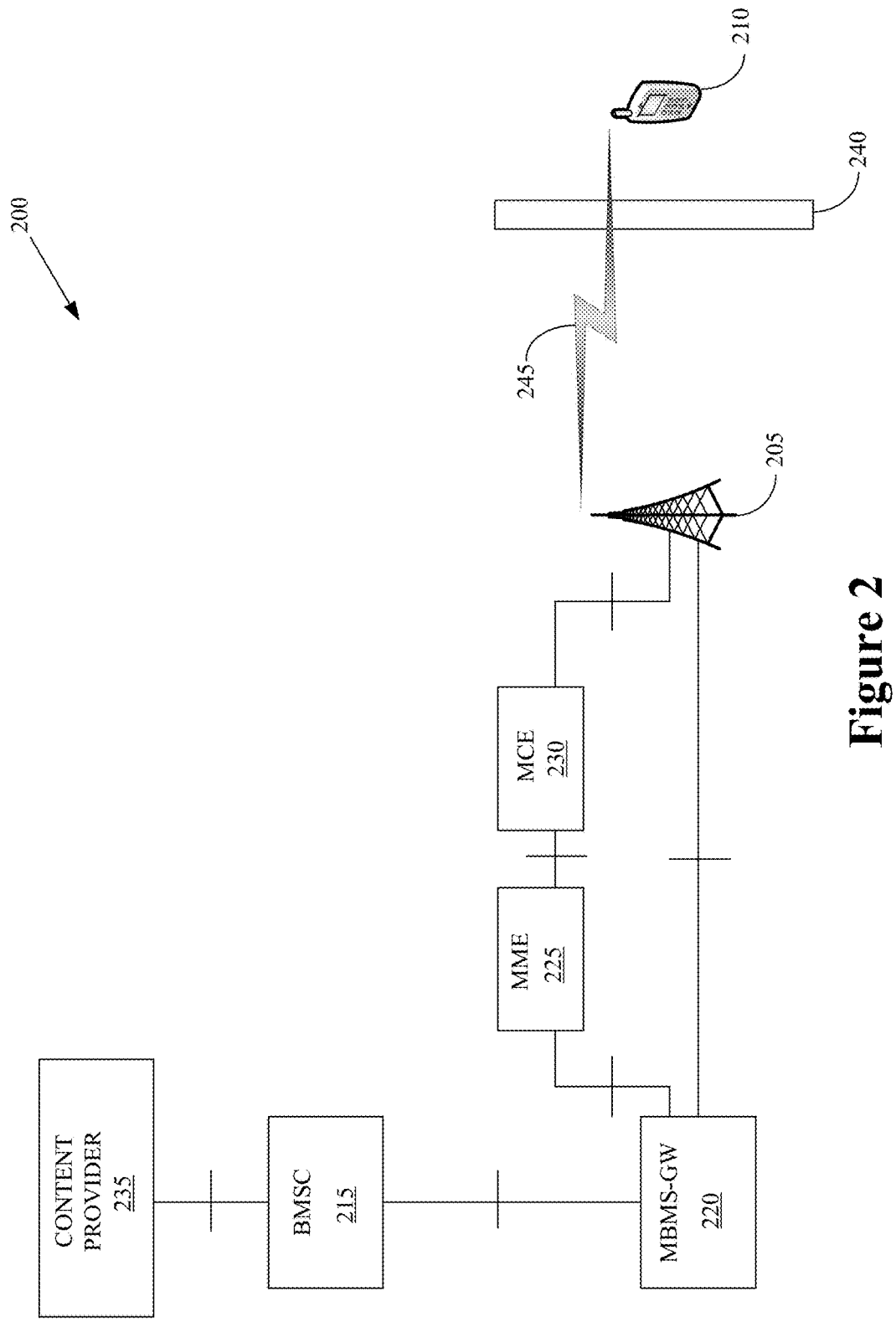
FIG. 2 conceptually illustrates a second exemplary embodiment of a wireless communication system.

FIG. 2 conceptually illustrates a second exemplary embodiment of a wireless communication system 200. Some embodiments of the wireless communication system 200 include a base station or eNodeB (eNB) 205 that can be configured to provide wireless connectivity to one or more user equipment 210. Some embodiments of the eNB 205 may transmit enhanced MBMS (eMBMS) bearers for one or more eMBMS user services. The wireless communication system 200 shown in FIG. 2 includes a broadcast multicast service center (BMSC) 215 that provides functions for initiating broadcast or multicast user service and delivery. Some embodiments of the BMSC 215 provide functions for eMBMS user service provisioning and delivery and the BMSC 215 may be the entry point for content provider eMBMS transmissions. Some embodiments of the BMSC 215 may be used to authorize and initiate eMBMS Bearer Services within the public land mobile network (PLMN) and to schedule and deliver eMBMS transmissions.

The second exemplary embodiment of the wireless communication system 200 also includes an MBMS gateway 220 that can broadcast or multicast packets to each base station or eNB 205 that may be transmitting a broadcast or multicast service to user equipment 210. Some embodiments of the gateway 220 may be responsible for sending or broadcasting of MBMS bearer data to each eNB 205 that may be transmitting the service. The MBMS GW 220 may use IP Multicast as the means of forwarding MBMS user data to the eNB 205. For example, the MBMS Gateway 220 can transmit multicast packets to each eNB in a multicast-broadcast single frequency network (MB-SFN) area (including the eNB 210) using Internet Protocol (IP) multicasting. The MBMS Gateway 220 may also perform header compression or other operations for the multicast services. The MBMS GW 220 also performs MBMS Session Control towards the E-UTRAN via one or more mobility management entities.

The wireless communication system 200 depicted in FIG. 2 includes a mobility management entity (MME) 225 that provides MBMS session control functions and connects the broadcast-only functions (BMSC and MBMS-GW) with the E-UTRAN. Some embodiments of the MME 225 may be a control-node for the LTE access network and may be responsible for idle mode tracking and paging of the user equipment 210. The MME 225 may also be involved in the bearer activation/deactivation process and may be responsible for choosing a serving gateway (not shown in FIG. 2) for user equipment 210 at the initial attach and at time of intra-LTE handover involving Core Network (CN) node relocation. The MME 225 may also be responsible for authenticating user equipment 210.

A multi-cell coordination entity (MCE) 230 may be connected to all the cells in an MB-SFN area. Some embodiments of the MCE 230 provide admission control functions and may coordinate radio resource allocations for eNBs in an MBSFN area. The MCE 230 may be involved in MBMS Session Control and may allocate radio resources used by the eNBs within an MB-SFN area including the eNB 205. The MCE 230 may therefore ensure that the same resource blocks are allocated for a given service across all the eNBs of a given MBSFN area. The MCE 230 may also configure MB-SFN subframes for multicast control or data broadcasts as well as providing information to configure the L2/L3 layers in the eNBs including the eNB 205.

A content provider 235 may be used to provide content that is to be transmitted to user equipment 210, e.g., by being broadcast, multicast, or unicast to the user equipment 210. Some embodiments of the wireless communication system 200 implement the content provider 235 within the system 200 and other embodiments of the wireless communication system 200 may receive content from a third party content provider 235 that is implemented outside of the wireless communication system 200.

An obstruction 240 intervenes between the base station 205 and user equipment 210 shown in FIG. 2. Consequently, as discussed herein, the signal strength of signals transmitted over an air interface 245 may be reduced or degraded. For example, as discussed herein, penetration losses due to propagation through the obstruction 240 may be on the order of 11-20 dB if the obstruction 240 is a portion of a building or on the order of 7 dB if the obstruction 240 is a portion of a car or other vehicle.

Figure 3:
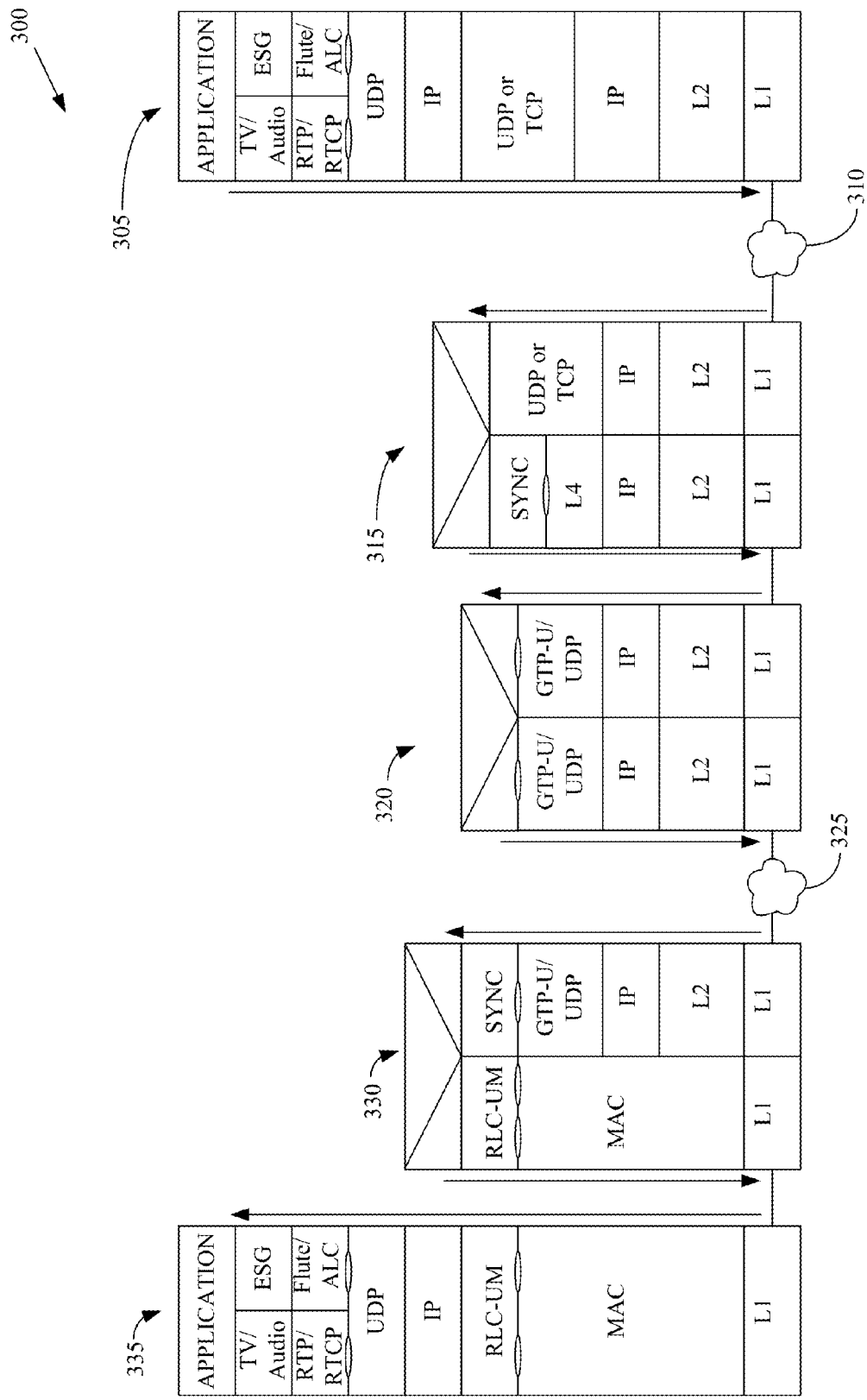
FIG. 3 conceptually illustrates one exemplary embodiment of a protocol stack that may be implemented in the second exemplary embodiment of the wireless communication system shown in FIG. 2.

FIG. 3 conceptually illustrates one exemplary embodiment of a protocol stack 300 that may be implemented in the second exemplary embodiment of the wireless communication system 200 shown in FIG. 2. The protocol stack 300 represents a content server 305 that is communicatively coupled to a content delivery network 310, which may or may not be a 3GPP compliant network. The content server 305 includes an application layer and a signal path from the application layer may travel through a TV/audio layer and a real-time transport protocol (RTP)/RTP control protocol (RTCP) layer, a user datagram protocol (UDP) layer, an Internet protocol (IP) layer, a UDP or transmission control protocol (TCP) layer, an IP layer, an L2 or link layer, and an L1 or physical layer before being conveyed into the network 310. Some embodiments of the content server 305 also include a File Delivery over Unidirectional Transport (FLUTE/ALC) layer that supports massively scalable reliable delivery of objects such as files, directories, clips, or electronic service guides (ESG) and an ESG layer. Techniques for implementation and operation of the layers in the content server 305 are known to persons of ordinary skill in the art and in the interest of clarity only those aspects of the implementation or operation of these layers that are relevant to the claimed subject matter are discussed herein.

A BMSC 315 is communicatively coupled to the content delivery network 310 and may therefore receive signals from the content server 305. Some embodiments of the BMSC 315 receive signals in an L1 layer of its protocol stack and the signal is processed in the L2 layer, IP layer, UDP or TCP layer and then passed to a synchronization layer (SYNC), an L4 or transport layer, an IP layer, an L2 layer, and an L1 layer. Techniques for implementation and operation of the layers in the BMSC 315 are known to persons of ordinary skill in the art and in the interest of clarity only those aspects of the implementation or operation of these layers that are relevant to the claimed subject matter are discussed herein.

The BMSC 315 is communicatively coupled to a multimedia broadcast/multicast server gateway (MBMS GW) 320, e.g., via an SGi-mb interface as defined by the 3GPP standards or protocols. The signal path through the MBMS GW 320 proceeds from an L1 layer to an L2 layer, an IP layer, an L4 layer, a general packet radio source (GPRS) tunneling protocol (GTP) or UDP layer, an IP layer, an L2 layer, and an L1 layer. The MBMS GW 320 is communicatively coupled to a network 325 such as an IP multicast-based distribution network. The network 325 may be used to provide the multicast or broadcast information to one or more base stations 330. The signal path through the base station 330 proceeds to an L1 layer, an L2 layer, an IP layer, a GTP/UDP layer, a SYNC layer, an RLC-UM (unacknowledged mode) layer, a media access control (MAC) layer, and an L1 layer. Techniques for implementation and operation of the layers in the MBMS GW 320 and the base station 330 are known to persons of ordinary skill in the art and in the interest of clarity only those aspects of the implementation or operation of these layers that are relevant to the claimed subject matter are discussed herein.

The base station 330 may then transmit the multicast or broadcast information over the air interface to user equipment 335. The user equipment 335 receives the signals at an L1 layer and subsequently processes them in a MAC layer, a RLC-UM layer, an IP layer, a UDP layer, and RTP/RTCP layer, a TV/audio layer, and an application layer.

Figure 4:
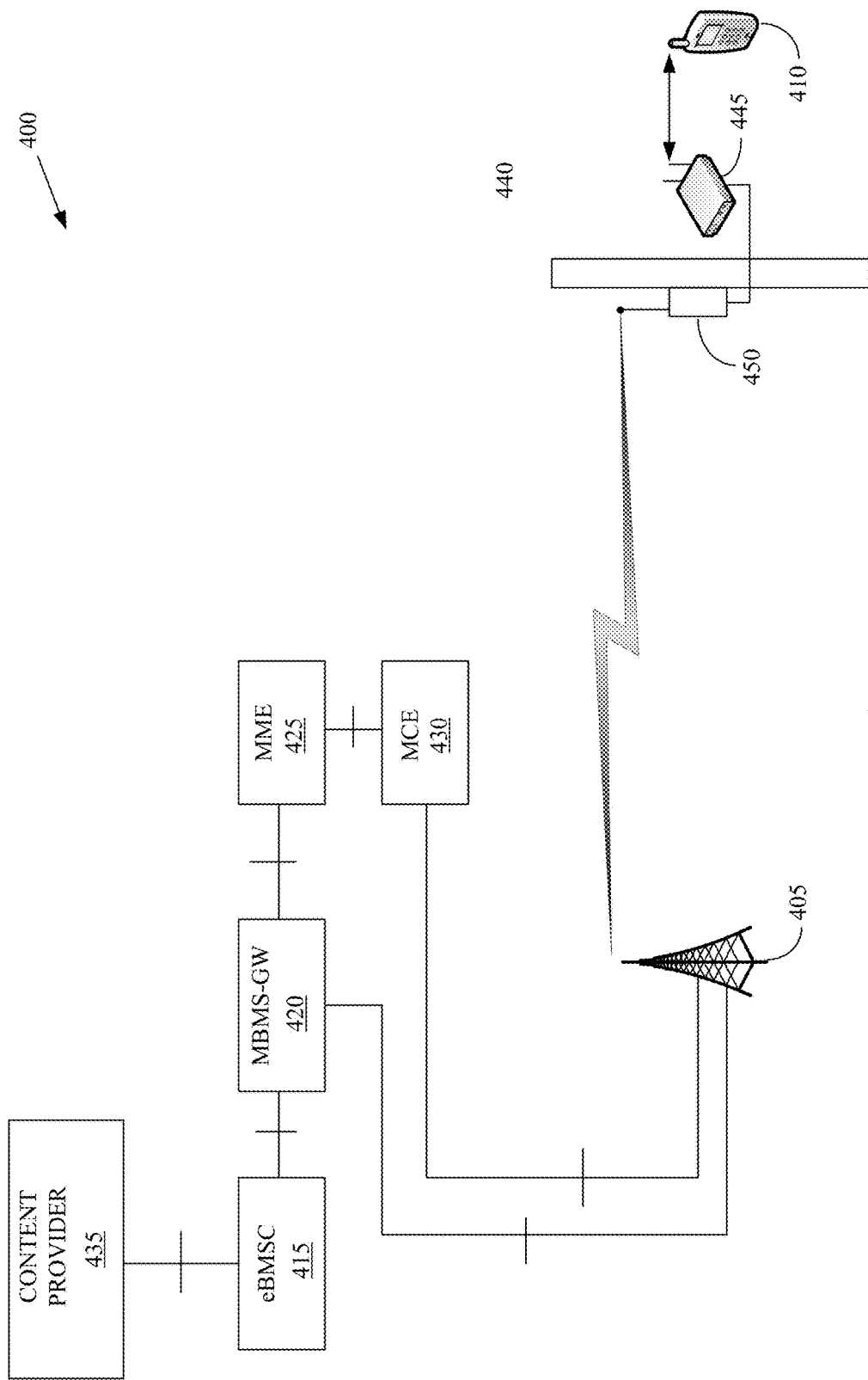
FIG. 4 conceptually illustrates a third exemplary embodiment of a wireless communication system.

FIG. 4 conceptually illustrates a third exemplary embodiment of a wireless communication system 400. Some embodiments of the wireless communication system 400 include a base station or eNodeB (eNB) 405 that can be configured to provide wireless connectivity to one or more user equipment 410. The wireless communication system 400 shown in FIG. 4 includes a broadcast multicast service center (BMSC) 415 that provides functions for initiating multicast user service and delivery, an MBMS gateway 420 that can broadcast or multicast packets to each base station or eNB 405 for providing a broadcast or multicast service to user equipment 410, a mobility management entity (MME) 425, a multi-cell coordination entity (MCE) 430, and a content provider 435 that may be used to provide content that is to be transmitted to user equipment 410. Some embodiments of these entities incorporate or implement the same functionality as the corresponding entities depicted in the second exemplary embodiment of the wireless communication system 200 shown in FIG. 2.

An obstruction 440 intervenes between the base station 405 and user equipment 410 shown in FIG. 4. As discussed herein, the obstruction 440 may be a portion of a building, a vehicle, or any other physical obstruction that reduces the signal strength of signals provided by the base station 405 as a travel towards the user equipment 410. The wireless communication system 400 therefore implements a gateway 445 that is physically, electromagnetically, or communicatively coupled to an antenna 450. A gateway 445 shown in FIG. 4 is on the same side of the obstruction 440 as user equipment 410 and may be referred to as an "internal" gateway 445. The antenna 450 is deployed on the same side of the obstruction as the base station 405 and may be referred to as an "external" antenna 450. Some embodiments of the antenna 450 are attached or fixed to a surface of the obstruction 440. For a car, the antenna 450 could be a button antenna mounted on the back of the car; and for a home or building, the antenna 450 may be a small antenna located on or near a window where the base station 405 provides suitable wireless coverage.

The external antenna 450 may gather radiofrequency signals transmitted by the base station 405. The signal may then be passed via a cable to the internal gateway 445, which may then transmit the broadcast or multicast services provided from the base station 405 and antenna 450 to the user equipment 410. Some embodiments of the gateway 445 may provide a Wi-Fi or other wireless unicast of the broadcast or multicast service to the user equipment 410. Some other embodiments of the gateway 445 may broadcast or multicast the service to user equipment 410 over Wi-Fi, e.g., in mall areas or other large indoor public gathering areas, or over other wireless link. In some embodiments, the transmitted signal may be a radiofrequency (RF) signal, in which case there may be losses before the signal hits the baseband unit of the gateway 445. Alternatively, the signal may be a sampled intermediate frequency (IF) signal that can be sent digitally with finite precision per sample to the baseband unit in the gateway 445. Some embodiments of the gateway 445 include authentication information that may be used to negotiate and authenticate the connection between the gateway 445 and network entity such as the BMSC 415. User equipment 410 may not need to authenticate itself with the BMSC 415. However, some embodiments of user equipment 410 may be mutually authenticated with the gateway 445 to establish a trusted connection for the multicast service.

Figure 5:
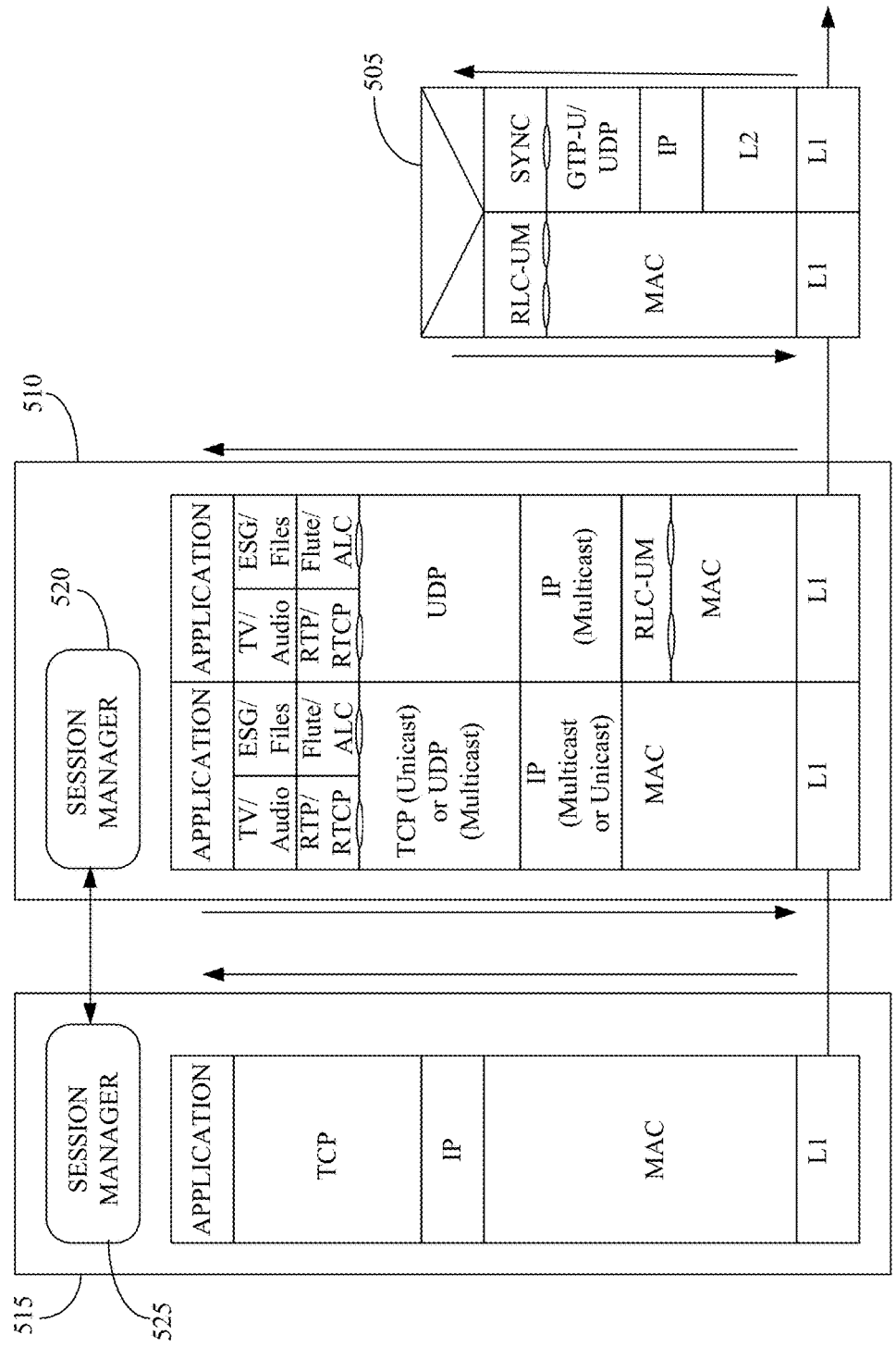
FIG. 5 conceptually illustrates one exemplary embodiment of a protocol stack that may be implemented in the third exemplary embodiment of the wireless communication system shown in FIG. 4.

FIG. 5 conceptually illustrates one exemplary embodiment of a protocol stack 500 that may be implemented in the third exemplary embodiment of the wireless communication system 400 shown in FIG. 4. The protocol stack 500 shown in FIG. 5 includes an eNB stack 505. Some embodiments of the eNB stack 505 may be connected to an MBMS GW, a BMSC, and one or more content servers, as depicted in FIG. 3. In the interest of clarity, these elements are not shown in FIG. 5. The signal path through the eNB stack 505 proceeds to an L1 layer, an L2 layer, an IP layer, a GTP/UDP layer, a SYNC layer, an RLC-UM (unacknowledged mode) layer, a media access control (MAC) layer, and an L1 layer.

The protocol stack 500 also includes a gateway 510. Embodiments of the gateway protocol stack 510 may be implemented as part of the gateways 125, 445 shown in FIGS. 1 and 4. The gateway 510 can decode the received signal down to the application layer. For example, the gateway 510 may receive the signals at an L1 layer and subsequently process them in a MAC layer, a RLC-UM layer, an IP (Multicast) layer, a UDP layer, and RTP/RTCP layer, a TV/audio layer, and an application layer. The gateway 510 may then decode the signal down to the application layer for provision to user equipment 515. For example, the gateway 510 may process the signal from the application layer to a TV/audio layer, an RTP/RTCP layer, a TCP layer (if the signal is to be unicast to user equipment 515) or a UDP layer (if the signal is to be multicast to user equipment 515), an IP multicast or unicast layer, a MAC layer, and an L1 layer. The user equipment 515 receives the signals at an L1 layer and subsequently processes them in a MAC layer, a RLC-UM layer, an IP layer, a TCP layer, and an application layer. In one embodiment, the session manager 520 may forward the information locally over a wired or wireless connection such as Wi-Fi. The gateway 510 may replace the IP header of the packets with the corresponding IP header for the local indoor IP multicast or a unicast IP header, depending upon whether the local session is also broadcast or multicast (but with a different IP multicast destination address) or unicast (with a unicast IP address). In another embodiment, an IP tunneling overlay may be used to tunnel the original eMBMS IP multicast from the gateway 510 to the user equipment 515.

The gateway 510 and user equipment 515 include session managers 520, 525, respectively. The session managers 520, 525 communicate with each other to control and coordinate establishing and tearing down sessions between the eNB 510 and user equipment 515. For example, once the user equipment 515 determines that the gateway 510 is nearby, e.g., by monitoring the RF link to detect the presence of a wireless signal such as Wi-Fi transmitted by the gateway 510, user equipment 510 may attach itself to the gateway 510. The session manager 520 is aware of the multicast services that are being received by user equipment 515 or that may be scheduled for later transmission to the user equipment 515. Some embodiments of the gateway 510 may already be connected to the macrocellular eMBMS service and so the session manager 520 may be able to provide program information such as a program guide) to the user equipment 515 via the session manager 525. The session manager 525 maintains a record of the programs or services that are currently being received by user equipment 515 or that are scheduled for reception by the user equipment 515 and may therefore provide a request identifying the programs or services to the session manager 520 in response to the user equipment 515 transitioning into a location served by the gateway 510.

The session manager 520 in the gateway 510 may receive the request from the session manager 525 in the user equipment 515, and the gateway 510 may use the provided information to establish an eMBMS session with the content provider for receiving the programs or services for user equipment 515. The gateway 510 may also establish a session for providing the information received in the eMBMS session to user equipment 515. In operation, the gateway 510 decodes the eMBMS signal up to the application layer and then re-packages the signal, e.g., using the WiFi side of the protocol stack 510. The TCP layer in the stack 510 is shown for unicast over Wifi. However, other embodiments of the gateway 510 may use a different protocol stack. For example, for a crowded indoor mall scenario, the gateway 510 may use an RTP layer to broadcast or multicast the information over the WiFi interface. Some embodiments of the session manager 525 may also provide requests to terminate a broadcast/multicast sessions with the gateway 510. The request may be provided in response to the program or services ending or in response to the user equipment 515 leaving the area covered by the gateway 510 with a signal strength above a threshold. The sessions between the gateway 510 and user equipment 515 and between the gateway 510 and the network may therefore be torn down in response to receiving the termination request.

User equipment 515 may also add new programming or change channels within the broadcast/multicast session. For example, if the user equipment 515 wants to change channels then the session manager 525 invokes the change to its counterpart session manager 520 in the gateway 510, e.g., by providing a request indicating the new programming or change of channels. The gateway 510 may use this request to modify the programming or services that it requests from the content server over its eMBMS session so that the gateway 510 receives the new programming or services and can provide this information to user equipment 515.

Although the session manager 520 is implemented in the gateway 510, persons of ordinary skill in the art should appreciate that some embodiments of the session manager 520 may be implemented in different locations. For example, the session manager 520 may be implemented in a content server such as the content server 305 shown in FIG. 3. In these embodiments, user equipment 515 or the session manager 525 may establish communication with the evolved packet core (ePC) or other network entities to control or coordinate the broadcast/multicast sessions. The gateway 510 may also establish an uplink (not shown in FIG. 5) to the eNB 515 to provide the eMBMS programs or services.

Figure 6:
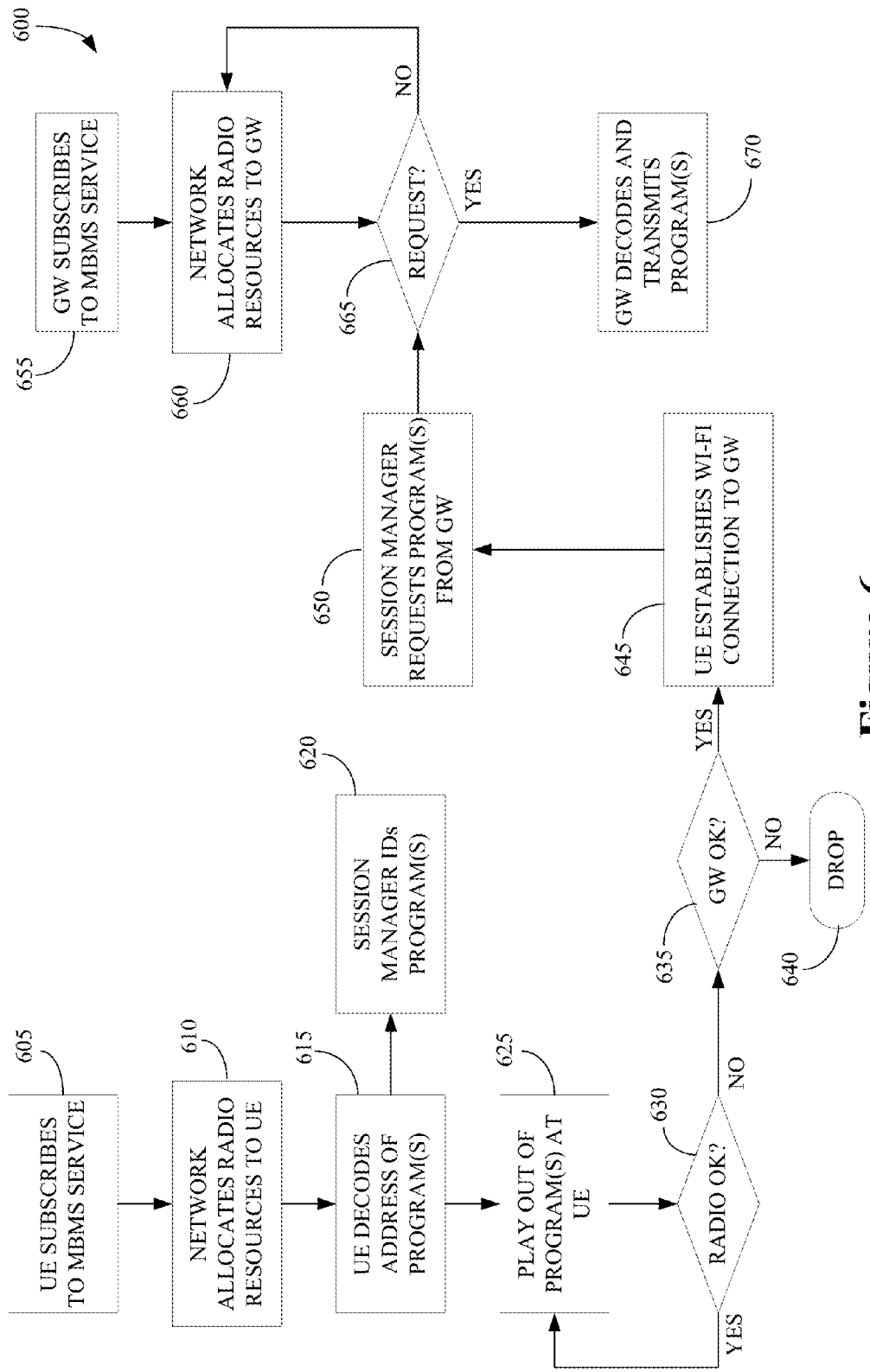
FIG. 6 conceptually illustrates one exemplary embodiment of a method for providing a broadcast/multicast service to obstructed user equipment.

FIG. 6 conceptually illustrates one exemplary embodiment of a method 600 for providing a broadcast or multicast service to obstructed user equipment. Embodiments of the method 600 may be implemented in the base station 510 or user equipment 515 shown in FIG. 5. In the illustrated embodiment, user equipment (UE) subscribes (at 605) to an MBMS service. At this point, the user equipment is not obstructed and therefore provides the request for the subscription directly to the network, e.g., to a BMSC or multicast content provider in the network. The network allocates (at 610) radio resources to the user equipment for broadcasting or multicasting the MBMS service towards the user equipment. For example, allocating (at 610) the radio resources may include providing an IP multicast address identifying an MBMS bearer for the MBMS service, informing the user equipment of a temporary mobile group identity (TMGI) allocated to the MBMS bearer, or providing a network layer service access point identifier that identifies a user equipment context for the MBMS service. Some embodiments of the method 600 may also provide (at 610) information indicating a start time for the data transfer by the MBMS service.

The user equipment may decode (at 615) addresses of the requested programs or services, such as the TMGI allocated to the MBMS bearer. A session manager implemented in the user equipment, such as the session manager 525 shown in FIG. 5, may identify (at 620) the requested programs and store information identifying the requested programs. The user equipment may also begin to play out (at 625) the requested program or programs using information received over the MBMS bearer. The user equipment may also monitor radio conditions for the communication link to the network concurrently with receiving and playing out (at 625) the requested program(s). As long as the signal strength of signals transmitted over the radio communication link remains sufficiently high (at 630), the user equipment may continue to receive and play out (at 625) the requested program received over the MBMS bearer. However, if the radio communication link quality deteriorates (at 630), the user equipment may determine (at 635) whether a signal strength from a gateway can support the MBMS service. For example, the user equipment may compare (at 630, 635) the signal strength for signals received from the network and the gateway to corresponding thresholds. If the user equipment determines (at 635) that the signal strength from the gateway is insufficient to support the MBMS service, the service may be dropped (at 640).

The user equipment may establish (at 645) a connection, such as a Wi-Fi connection, to the gateway in response to determining (at 635) that the signal strength from the gateway can support the MBMS service. The session manager in the user equipment may send a request (at 650) to the gateway for any current or pending programs associated with the previously established MBMS session. The gateway may also subscribe (at 655) to the MBMS service associated with the user equipment. Some embodiments of the gateway may subscribe (at 655) to the service in response to a session manager in the gateway receiving a request from the session manager in the user equipment. Other embodiments of the gateway may subscribe (at 655) to the service using information previously exchanged between the session managers and an indication that the user equipment has moved into an area served by the gateway. The network may then allocate (at 660) radio resources to the gateway for the MBMS service. Establishment of the Wi-Fi connection (at 645), requesting the program (at 650), subscribing to the MBMS service (at 655), or allocating the network resources (at 660) may therefore take place in any order or concurrently.

The gateway may then wait (at 665) for a request from the session manager on the user equipment to receive the MBMS services. Once the gateway detects (at 665) a request from the user equipment to receive the MBMS services from the gateway, the gateway may begin decoding (at 670) the MBMS services and transmitting them towards the user equipment.

Figure 7:
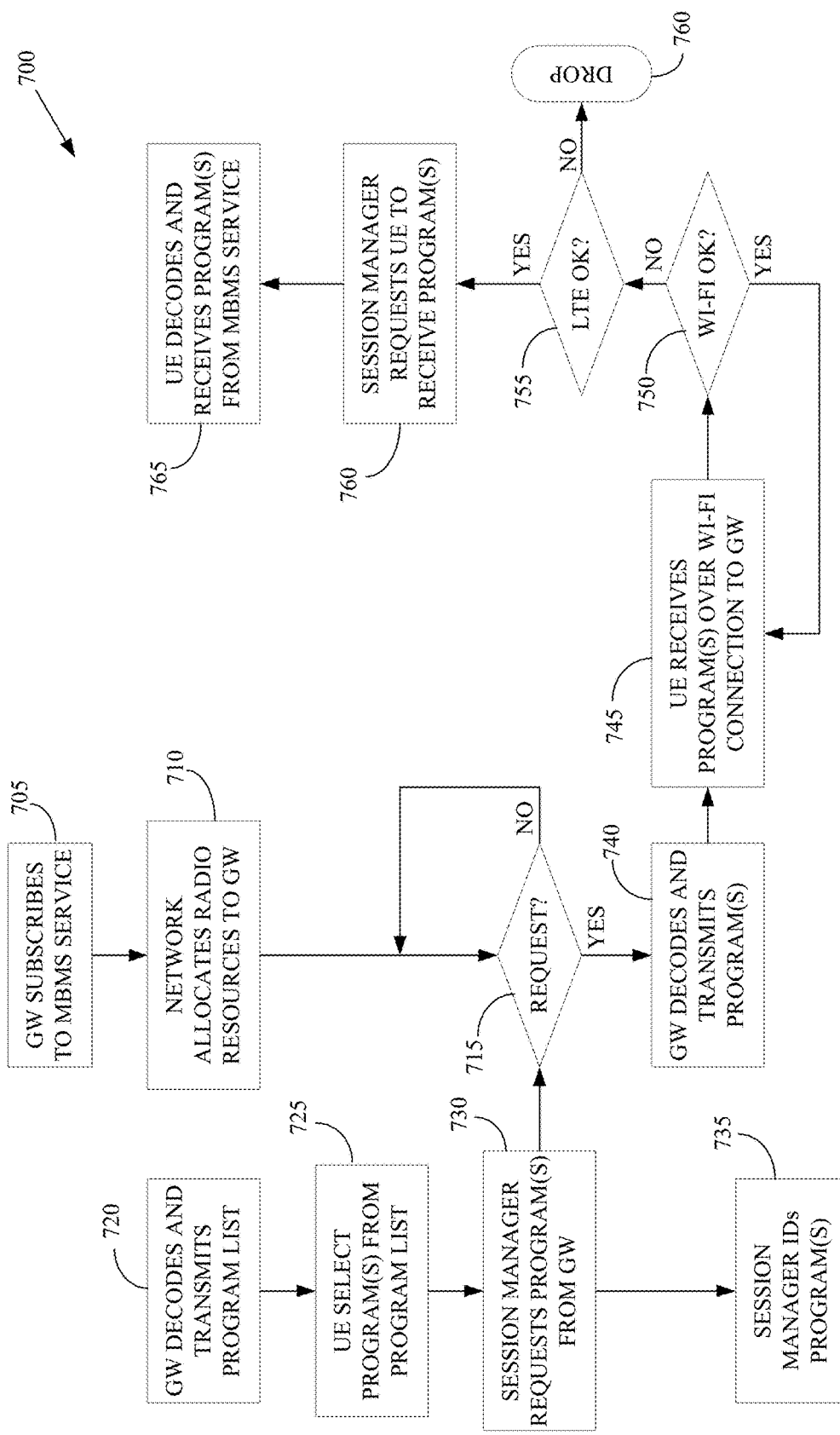
FIG. 7 conceptually illustrates one exemplary embodiment of a method for providing a broadcast/multicast service to obstructed user equipment.

FIG. 7 conceptually illustrates one exemplary embodiment of a method 700 for providing a broadcast or multicast service to obstructed user equipment. Embodiments of the method 700 may be implemented in the base station 510 or user equipment 515 shown in FIG. 5. In the illustrated embodiment, the user equipment is initially in an obstructed location served by a gateway and therefore the user equipment has a connection to the gateway such as a Wi-Fi connection to the gateway. The gateway may then subscribe (at 705) to one or more MBMS services that may be associated with the user equipment. The network may then allocate (at 710) radio resources for a communication session that can be used to transmit the MBMS services. The gateway may then wait (at 715) for a request from the user equipment for one or more of the MBMS services.

The gateway may also decode (at 720) and transmit a program list to the user equipment that includes information identifying the programs that can be provided using the MBMS services. Decoding (at 720) and transmitting the program list may be performed concurrently with the network allocating (at 710) radio resources to the gateway. The user equipment may then select (at 725) one or more programs from the program list and a session manager implemented in the user equipment may request (at 730) the selected programs from the gateway, e.g., by transmitting (at 730) a request to a corresponding session manager associated with the gateway. The session managers in the user equipment or the gateway may also identify (at 735) or store information identifying the requested programs.

In response to receiving (at 715) a request from the session manager on the user equipment, the gateway can begin decoding (at 740) the programs received from the content server and transmitting the requested programs, e.g., over the Wi-Fi connection to the user equipment. The user equipment may therefore receive (at 745) the requested programs, e.g., over the Wi-Fi connection with the gateway. As long as signal strength of the Wi-Fi connection with the gateway remains (at 750) sufficiently high, the user equipment continues to receive (at 745) the requested programs from the gateway. However, if the user equipment determines (at 750) that the signal strength of the Wi-Fi connection has deteriorated, e.g., the signal strength has fallen below a threshold value, the user equipment may determine (at 755) whether the signal strength provided by the network, such as the signal strength provided by a system operating according to LTE, is sufficiently high to support the requested MBMS services. If not, the MBMS sessions may be dropped (at 760).

If the signal strength of the network connection is sufficiently high, e.g., the signal strength is above a threshold value, the session manager may provide (at 765) a request to have the user equipment begin receiving the MBMS services using a session established with the network. For example, the session manager may provide signaling to a radio in the user equipment that can be used to configure the radio to establish the session and receive the MBMS services from the network. The user equipment may then begin decoding (at 770) information received using the communication session with the network and providing the decoded MBMS programs to the user of the user equipment.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be a non-transitory storage medium, a magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
    a gateway configured for communicative coupling to an antenna, wherein the gateway is configured to establish a first broadcast/multicast session with a base station for wirelessly receiving at least one broadcast or multicast service, wherein the at least one broadcast or multicast service is for wireless reception by user equipment using a second broadcast/multicast session established between the user equipment and the base station, wherein the second broadcast/multicast session bypasses the gateway, wherein the gateway is configured to establish a communication session for providing information received in the first broadcast/multicast session to the user equipment, and wherein the first broadcast/multicast session is terminated at the gateway; and
    a first session manager for the gateway, wherein the first session manager is configured to provide signaling to establish the first broadcast/multicast session in response to the gateway determining that the user equipment has attached to the gateway and the first session manager identifying the at least one broadcast or multicast service associated with user equipment.

2. The apparatus of claim 1, wherein the gateway is configured to establish both the first broadcast/multicast session and the communication session in response to receipt of a request from the user equipment.

3. The apparatus of claim 1, wherein the gateway is configured to establish both the first broadcast/multicast session and the communication session in response to receipt of an indication that the user equipment has moved from an external location to an internal location.

4. The apparatus of claim 1, wherein the gateway is configured to establish the first broadcast/multicast session and the communication session in response to determining that the user equipment is within a predetermined distance of the gateway.

5. The apparatus of claim 1, comprising the antenna, wherein the antenna is configured for coupling to an exterior surface of a building or vehicle, and wherein the gateway is configured for coupling to an interior surface of the building or the vehicle.

6. The apparatus of claim 5, wherein the gateway is configured to establish the first broadcast/multicast session and the communication session in response to determining that the user equipment is within the building or the vehicle.

7. The apparatus of claim 1, wherein the first session manager is configured to communicate with a second session manager implemented in the user equipment, and wherein the gateway is configured to establish the first broadcast/multicast session in response to the signaling provided by the first session manager in response to receipt of a request from the second session manager.

8. The apparatus of claim 1, wherein establishing the first broadcast/multicast session comprises authenticating the gateway to a broadcast multicast service center (BM-SC), and wherein establishing the communication session comprises authenticating the user equipment to the gateway.

9. The apparatus of claim 1, wherein the gateway is configured to provide a request for a new multicast service to be provided using the first broadcast/multicast session in response to receiving a request for the new multicast service from the user equipment, and wherein the gateway is configured to provide the new multicast service to the user equipment using the communication session.

10. The apparatus of claim 1, wherein the gateway is configured to tear down the first broadcast/multicast session and the communication session in response to receipt of a request from the user equipment.

11. A method, comprising:
    establishing, at a gateway, a first broadcast/multicast session with a base station for wirelessly receiving at least one broadcast or multicast service, wherein the at least one broadcast or multicast service is for wireless reception by user equipment using a second broadcast/multicast session established between the user equipment and the base station, wherein the first broadcast/multicast session is terminated at the gateway, and wherein the second broadcast/multicast session bypasses the gateway;
    establishing, at the gateway, a communication session for providing information received in the first broadcast/multicast session to the user equipment;
    providing the signaling to establish the first broadcast/multicast session in response to a first session manager determining the user equipment has attached to the gateway; and
    identifying the at least one multicast/broadcast service provided to the user equipment using the second broadcast/multicast session.

12. The method of claim 1, comprising receiving, at the gateway, a request from the user equipment to receive the at least one broadcast or multicast service and wherein said establishing the first broadcast/multicast session and said establishing the communication session are performed in response to said receiving the request.

13. The method of claim 11, wherein said establishing the first broadcast/multicast session and said establishing the communication session are performed in response to the user equipment has moved from an external location to an internal location, and the method comprising receiving an indication that the user equipment previously established the second broadcast/multicast session for wirelessly receiving the at least one broadcast or multicast service at the external location.

14. The method of claim 11, comprising determining, at the gateway, a distance between the user equipment and the gateway, and wherein said establishing the first broadcast/multicast session and said establishing the communication session are performed in response to determining that the distance is less than a threshold distance.

15. The method of claim 14, wherein the gateway is configured for coupling to an interior surface of a building or a vehicle, and wherein said establishing the first broadcast/multicast session and said establishing the communication session comprises establishing the first broadcast/multicast session and the communication session respectively in response to determining that the user equipment is within the building or the vehicle.

16. The method of claim 11, comprising establishing the first broadcast/multicast session in response to the signaling provided by the first session manager for the gateway in response to a request from a second session manager implemented in the user equipment.

17. The method of claim 11, wherein establishing the first broadcast/multicast session comprises authenticating the gateway to a broadcast multicast service center (BM-SC), and wherein establishing the communication session comprises authenticating the user equipment to the gateway.

18. The method of claim 11, comprising:
providing a request for a new multicast service to be provided using the first broadcast/multicast session in response to receiving a request for the new multicast service from the user equipment, and
providing the new multicast service to the user equipment using a third session.

19. The method of claim 11, comprising tearing down the first broadcast/multicast session and the communication session in response to a request from the user equipment.

20. User equipment including a processor configured to:
provide a request to receive at least one of a broadcast or multicast service from a gateway that terminates a first broadcast/multicast session used to wirelessly provide said at least one of the broadcast or multicast service from a base station to the gateway, wherein the user equipment is configured to wirelessly receive the at least one of the broadcast or multicast service using a second broadcast/multicast session established between the user equipment and the base station, and wherein the second broadcast/multicast session bypasses the gateway; and
establish a communication session with the gateway for receiving said at least one broadcast or multicast service, wherein the processor comprises a first session manager configured to communicate with a second session manager associated with the gateway, and wherein the first session manager is configured to provide signaling to initiate establishment of the communication session in response to the user equipment attaching to the gateway and the first session manager identifying said at least one broadcast or multicast service associated with the user equipment.

21. The user equipment of claim 20, wherein the user equipment is configured to provide the request in response to at least one of the user equipment being within a threshold distance of the gateway, the user equipment being within a building or vehicle associated with the gateway, a signal strength for a signal from the gateway being above a first threshold, or a signal strength for a signal from a base station being below a second threshold.

22. The user equipment of claim 20, wherein the processor is configured to authenticate the user equipment to the gateway during establishment of the communication session.

23. The user equipment of claim 20, wherein the processor is configured to provide a request to tear down the communication session and subsequently tear down the communication session.

24. A method, comprising:
providing, from user equipment, a request to receive at least one of a broadcast or multicast service from a gateway that terminates a first broadcast/multicast session used to wirelessly provide said at least one of the broadcast or multicast service from a base station to the gateway, wherein the user equipment is configured to wirelessly receive the at least one of the broadcast or multicast service using a second broadcast/multicast session established between the user equipment and the base station, and wherein the second broadcast/multicast session bypasses the gateway;
establishing, at the user equipment, a communication session with the gateway for receiving said at least one of the broadcast or multicast service; and
providing signaling from a first session manager to initiate establishment of the communication session in response to the user equipment attaching to the gateway and the first session manager identifying said at least one of the broadcast or multicast service associated the user equipment.

25. The method of claim 24, comprising providing the request in response to at least one of the user equipment being within a threshold distance of the gateway, the user equipment being within a building or vehicle associated with the gateway, the user equipment detecting a signal strength for a signal from the gateway that is above a first threshold, or the user equipment detecting a signal strength for a signal from a base station that is below a second threshold.

26. The method of claim 24, wherein establishing the second session comprises authenticating the user equipment to the gateway.

27. The method of claim 24, comprising providing a request to tear down the communication session and subsequently tearing down the communication session.

* * * * *

UNITED STATES PATENT AND TRADEMARK OFFICE
CERTIFICATE OF CORRECTION

PATENT NO. : 9,686,654 B2
APPLICATION NO. : 13/722076
DATED : June 20, 2017
INVENTOR(S) : Zulfiquar Sayeed et al.

It is certified that error appears in the above-identified patent and that said Letters Patent is hereby corrected as shown below:

In the Claims

Column 16, Claim 13, Line 48, please delete "to the" and substitute -to determining the-.

Column 18, Claim 24, Line 33, please delete "associated the" and substitute -associated with the-.

Signed and Sealed this
Twenty-seventh Day of August, 2019

Andrei Iancu
*Director of the United States Patent and Trademark Office*